No. 673,251.
C. S. FOWLER.
CREAM SEPARATOR.
(Application filed June 28, 1900.)
Patented Apr. 30, 1901.
(No Model.)
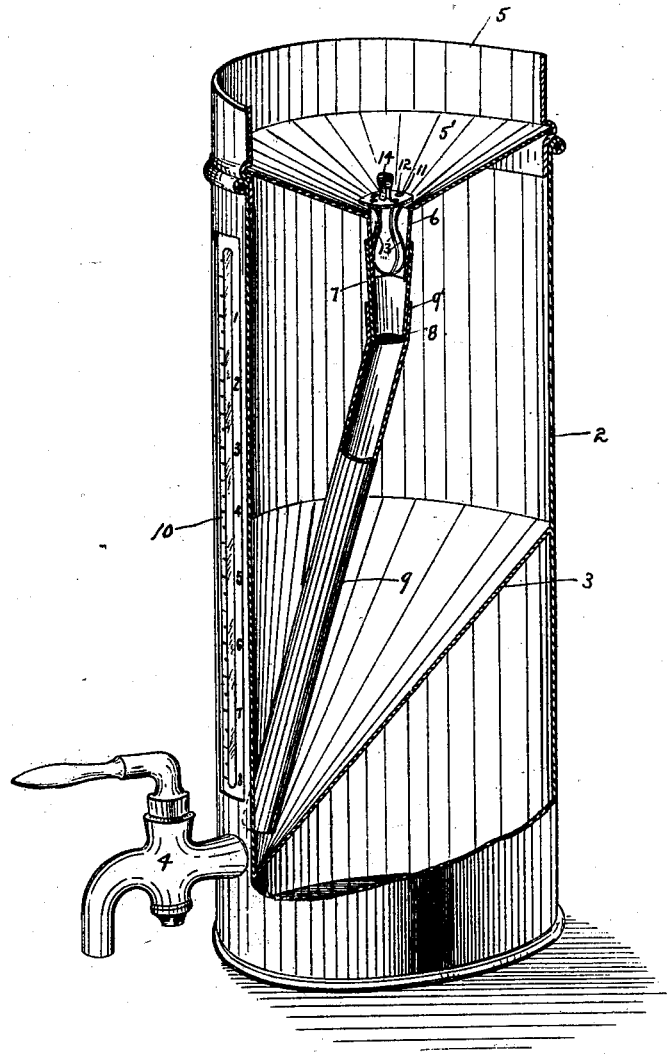

UNITED STATES PATENT OFFICE.

CHARLES S. FOWLER, OF MINNEAPOLIS, MINNESOTA.

CREAM-SEPARATOR.

SPECIFICATION forming part of Letters Patent No. 673,251, dated April 30, 1901.

Application filed June 28, 1900. Serial No. 21,870. (No model.)

*To all whom it may concern:*

Be it known that I, CHARLES S. FOWLER, of the city of Minneapolis, in the county of Hennepin and State of Minnesota, have invented certain new and useful Improvements in Cream-Separators, of which the following is a specification.

My invention relates to cream-separators, and particularly to that class in which cold water is introduced to a quantity of milk from the bottom of the milk, and has for its object the simplification of such devices and the provision of a cream-separator of the most simple, durable, efficient, and economical construction and one so constructed that all parts can be readily and thoroughly cleansed.

A further object is to provide simple means by which the delivery of the water to the milk can be regulated as required.

To these ends my invention consists in the constructions and combinations of parts hereinafter described, and particularly pointed out in the claim, and will be more readily understood by reference to the accompanying drawing, in which the figure is a general perspective view of a cream-separator embodying my invention, portions thereof being broken away to more clearly show the construction thereof.

As shown in the drawing, 2 represents the main wall of the separator, which is preferably cylindrical, as shown, and preferably formed of sheet metal.

3 represents the bottom, which, as shown, is preferably in the form of an oblique cone, the apex being at the front of the separator. A faucet of the ordinary or any preferred construction is provided in the wall 3 and communicates with the chamber of the separator at the apex of the bottom for the purpose hereinafter set forth. A cylindrical wall 5 is provided with a tapering bottom in the form of a right cone with an opening at its apex. A nipple 6 is formed, preferably integral with the bottom 5' and extends a slight distance beyond the apex of the bottom. The wall 5 and bottom 5' thus form a receptacle to hold the water when it is desired to introduce the same to the body of milk in the separator, as hereinafter described, and also form a reversible cover. A short pipe-section 7 is provided, adapted to slip over the end of the nipple 6 and provided in its lower end with a strainer 8, formed of wire-cloth of extremely-fine mesh. A pipe 9 is provided with a portion 9', bent at an obtuse angle to the main body portion of the pipe 9, so that the part 9' is adapted to slip over the end of the pipe 7 and permit the pipe 9 to extend down at an angle, so as to communicate to the apex of the bottom 3.

A water-regulator is provided. This consists of the plate 11, provided with a series of fine holes 12 and adapted to be retained in the outlet in the bottom 5' of the water-receptacle by a series of spring wires or strips 13. A suitable handle 14 is provided for this water-regulator, by which it may be raised and lowered to regulate the flow of water through the outlet and thence through the nipple 6, pipe 7, strainer 8, and pipe 9 to the bottom of the separating-chamber. A glass gage 10, suitably graduated, is provided in the front of the wall 3, so that both a correct measurement of the rising cream may be had and also that the operator may at all times be able to ascertain the exact condition of the milk and cream in the separator.

The operation is as follows: A quantity of milk is poured into the separator as soon as possible after milking and while the milk still retains its animal heat. The milk is either poured into the receptacle 5 and thence strained by passing through the pipes 6 7, strainer 8, and thence through the pipe 9 into the main separator-chamber or first strained and then poured directly into the separator-chamber, the combined cover and receptacle 5 being removed for this purpose. The latter method being the cleanliest is found preferable. A quantity of water equal to the body of milk provided in the separator is then poured into the water-receptacle, the water-regulator having been first placed in position in the nipple 6 and adjusted to give the desired flow of water. The water is then permitted to flow through the regulator and through the strainer and pipes into the apex of the bottom. It then slowly mingles with the milk in the separator-chamber, forcing the cream to the top of the separating-chamber. It is of the utmost importance that the water be delivered into the milk very slowly. The best results are always secured by allowing the flow of water to be very slight, as well as using very cold water. After the water has flowed from the chamber or receptacle, the receptacle with the pipes 7 and 9 are withdrawn, the pipe 9 removed from the pipe 7, and the regulator removed from the opening in the bottom 5', the short pipe 7 being left on the nipple 6. The receptacle 5 is then reversed and fitted over the upper end of the cylindrical wall 2, forming a cover for the separator, and the short pipe 7, extending from the nipple 6, allows the required ventilation, while the strainer therein prevents dirt or objectionable matter entering the chamber. The milk is then permitted to stand until all the cream has risen, which fact is ascertainable through the gage 10. The time usually required is from thirty to sixty minutes, according to the temperature of the water used. The faucet is then opened and the water and milk slowly withdrawn from the separator-chamber, a watch being kept through the gage 10, so that as soon as the water and milk have been entirely withdrawn the operator can change receiving pans or receptacles and again open the faucet, and all of the cream, without any milk or water, can be readily drawn off into such receiving pan or receptacle.

Having thus described my invention, I claim as new and desire to secure by Letters Patent—

In a cream-separator, the combination, with a main separating-chamber, provided with a bottom in the form of an oblique cone and with a faucet or outlet therefrom, of a reversible cover provided at its apex with an outlet or aperture, a pipe adapted to be connected to said cover and communicate from said aperture to the bottom of said chamber and provided with a strainer, of a water-regulator 11 adjustably mounted in said aperture whereby the flow of water therethrough may be regulated as desired, substantially as described.

In testimony whereof I have hereunto affixed my hand, at Minneapolis, Minnesota, this 18th day of June, A. D. 1900.

CHARLES S. FOWLER.

In presence of—
FREDERICK D. LYON,
R. J. BURGLEHAUS.